US008705202B2

(12) United States Patent
Hirono et al.

(10) Patent No.: US 8,705,202 B2
(45) Date of Patent: *Apr. 22, 2014

(54) REDUCE LEAKAGE OF LOW-DENSITY GAS DURING LOW-DENSITY GAS INJECTION INTO A DISK DRIVE

(75) Inventors: Yoshiyuki Hirono, Kanagawa (JP); Kouki Uefune, Kanagawa (JP); Takashi Kouno, Ibaraki (JP); Takako Hayakawa, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 5 days.

This patent is subject to a terminal disclaimer.

(21) Appl. No.: 13/190,470

(22) Filed: Jul. 25, 2011

(65) Prior Publication Data

US 2012/0008235 A1 Jan. 12, 2012

Related U.S. Application Data

(63) Continuation of application No. 12/009,376, filed on Jan. 17, 2008, now Pat. No. 7,986,490.

(30) Foreign Application Priority Data

Jan. 19, 2007 (JP) .................................. 2007-010771

(51) Int. Cl.
*G11B 33/08* (2006.01)

(52) U.S. Cl.
USPC ...................................................... 360/97.16

(58) Field of Classification Search
USPC ........................................... 360/97.16, 97.18
See application file for complete search history.

(56) References Cited

U.S. PATENT DOCUMENTS

| 5,075,807 | A  | * | 12/1991 | Inoue et al. ................ 360/97.02 |
| 5,138,506 | A  | * | 8/1992  | Beck et al. ................. 360/97.03 |
| 6,958,876 | B2 | * | 10/2005 | Feliss et al. ..................... 360/69 |
| 2003/0021054 | A1 | * | 1/2003 | Feliss et al. ..................... 360/69 |
| 2003/0179489 | A1 | * | 9/2003 | Bernett et al. ............. 360/97.01 |
| 2004/0171231 | A1 |   | 9/2004 | Yanagita et al. |
| 2005/0068666 | A1 |   | 3/2005 | Albrecht et al. |
| 2008/0088969 | A1 | * | 4/2008 | Uefune et al. ............. 360/97.02 |
| 2008/0165448 | A1 | * | 7/2008 | Ichikawa et al. ........... 360/97.02 |

FOREIGN PATENT DOCUMENTS

| JP | 61-222085 | 10/1986 |
| JP | 64-032482 | 2/1989 |
| JP | 01-191391 | 8/1989 |
| JP | 05-062446 | 3/1993 |
| JP | 08-161881 | 6/1996 |

(Continued)

*Primary Examiner* — David D Davis

(57) ABSTRACT

Embodiments of the present invention help to prevent leakage of low-density gas during low-density gas injection into a disk drive device and to perform low-density gas injection efficiently. In a hard disk drive (HDD) according to one embodiment of the present invention, an injection hole filter with a valve function is attached to a helium injection hole in order to inject helium gas in an enclosure. The injection hole filter has a valve member configured to operate in an open state or closed state. The open state is a state while the helium gas is being injected and the closed state is a state after the helium gas has been finished to be injected. The valve member is in the open state if the outside pressure is higher than the inside pressure and is in the closed state if the inside pressure is higher than the outside pressure.

11 Claims, 9 Drawing Sheets

(56) References Cited

FOREIGN PATENT DOCUMENTS

| JP | 10-193241 | 7/1998 |
| JP | 2001-118359 | 4/2001 |
| JP | 2004/071112 | 3/2004 |
| JP | 2004/295993 | 10/2004 |

* cited by examiner

Fig. 9(a)

| | CURRENT CONSUMPTION REDUCED AMOUNT (mA) |
|---|---|
| A→B 1ST TIME | 204.3 |
| A→B 2ND TIME | 204.1 |
| A→B 3RD TIME | 206.5 |
| A→B AVERAGE VALUE | 204.9 |
| | |
| B→A 1ST TIME | 194.0 |
| B→A 2ND TIME | 188.6 |
| B→A 3RD TIME | 189.4 |
| B→A AVERAGE VALUE | 190.7 |

Fig. 9(b)

| | TIME COEFFICIENT (sec) |
|---|---|
| A→B 1ST TIME | 16.0 |
| A→B 2ND TIME | 15.0 |
| A→B 3RD TIME | 14.5 |
| A→B AVERAGE VALUE | 15.2 |
| | |
| B→A 1ST TIME | 16.0 |
| B→A 2ND TIME | 17.5 |
| B→A 3RD TIME | 18.5 |
| B→A AVERAGE VALUE | 17.3 |

REDUCE LEAKAGE OF LOW-DENSITY GAS DURING LOW-DENSITY GAS INJECTION INTO A DISK DRIVE

CROSS-REFERENCE TO RELATED APPLICATION

This application is a continuation of application Ser. No. 12/009,376 entitled "Reduce Leakage of Low-Density Gas during Low-Density Gas Injection into a Disk Drive", filed Jan. 17, 2008, now U.S. Pat. No. 7,986,490 and assigned to the same assignee, the disclosure of which is incorporated herein in its entirety by reference.

This application also claims priority from the Japanese Patent Application No. 2007-010771, filed Jan. 19, 2007, the disclosure of which is incorporated herein in its entirety by reference.

BACKGROUND OF THE INVENTION

Nowadays, hard disk drives (hereinbelow, referred to as HDDs) rotate magnetic disks and drive head gimbal assemblies (hereinbelow, referred to as HGAs) at high speed in response to requests for huge capacity, high recording density, and high-speed accessing. These cause fluctuation of air (turbulence) to buffet the magnetic disks and HGAs. This turbulence buffeting will be a big disturbance for positioning heads for data which are recorded with high-density on a magnetic disk. This is because the turbulence occurs at random and it is difficult to estimate its magnitude and cycle so that swift and accurate positioning control will be complex and difficult. Also the turbulence buffeting may cause a noise to impair the quietness of the device.

Another problem caused by influence of the air within the device due to the high-speed rotation other than the foregoing is increase of electric power consumption. When the magnetic disk is rotated at high-speed, the air around the disk is dragged and rotated together. On the other hand, the air apart from the magnetic disk remains still so that shearing force arises therebetween to become a load against the rotation of the disk. This is called as windage loss, which becomes larger as the disk rotates at higher speed. In order to rotate the disk at high-speed against the windage loss, a motor will require a larger output and electric power.

Focusing on that the above-described turbulence and windage loss are proportional to the density of the gas within the device, there is an idea to reduce the turbulence and windage loss by enclosing low-density gas instead of air in a hermetically-sealed HDD. Hydrogen, helium, or the like is exemplified as the low-density gas, but helium is optimum because it is effective, stable, and safe in considering actual use. HDDs with sealed helium gas can solve the above-described problems and realize swift and accurate positioning control, electric power saving, and satisfactory quietness.

However, molecules of helium are so small and a diffusion coefficient of helium is large. Therefore, there has been a problem that enclosures used for usual HDDs are poorly sealed so that helium gas leaks easily during normal use. In order to make it possible to hermetically seal low-density gas such as helium gas, for example, a technique disclosed in U.S. Patent Publication No. 2005/0068666 ("Patent Document 1") described below has been suggested.

Helium gas is enclosed in an enclosure in manufacturing the HDD. For example, assembling components of the HDD in a chamber filled with helium gas results in enclosing helium gas in the enclosure. However, preparing such a chamber costs much and significantly reduces production capability. Therefore, an approach is considered to fill up helium gas in the enclosure: after assembling the components in the enclosure, injects helium gas under pressure through a hole on the enclosure while discharging the air in the enclosure through another hole. This approach accomplishes helium gas injection in a normal factory.

Thus, in the case that helium gas is injected into the enclosure by use of the injection hole and the emission hole, it is required to seal the injection hole after helium gas has been injected. Typically, the holes are sealed by attaching aluminum sealing tapes to the outer surface of the enclosure. However, if a certain time has elapsed from the helium gas injection until the attachment of the sealing tape, the helium gas injected within the enclosure will leak out so that the helium density within the enclosure will decrease. Or, if it takes time to inject the helium gas, throughputs in manufacturing HDDs will be reduced. Therefore, it is required to inject helium gas into the enclosure as quickly as possible to reduce the injection time.

BRIEF SUMMARY OF THE INVENTION

Embodiments of the present invention help to prevent leakage of low-density gas during low-density gas injection into a disk drive device and to perform low-density gas injection efficiently. In an HDD 1 according to the particular embodiment of FIGS. 1 and 2, an injection hole filter 261 with a valve function is attached to a helium injection hole in order to inject helium gas in an enclosure. FIG. 4(a) shows the injection hole filter 261 with a valve member 612 in an open state and FIG. 4(b) shows the injection hole filter 261 with the valve member 612 in a closed state. The open state of FIG. 4(a) is a state while the helium gas is being injected and the closed state of FIG. 4(b) is a state after the helium gas has been finished to be injected. The valve member 612 is in the open state if the outside pressure is higher than the inside pressure and is in the closed state if the inside pressure is higher than the outside pressure.

BRIEF DESCRIPTION OF THE DRAWINGS

The accompanying drawings, which are incorporated in and form a part of this specification, illustrate embodiments of the invention and, together with the description, serve to explain an embodiments of the present invention:

FIGS. 9(a) and 9(b) are experiment results showing the differences of the gas injection time according to the hole positions of the helium injection hole and the gas emission hole of the HDD according to one embodiment.

DETAILED DESCRIPTION OF THE INVENTION

Figure 1:
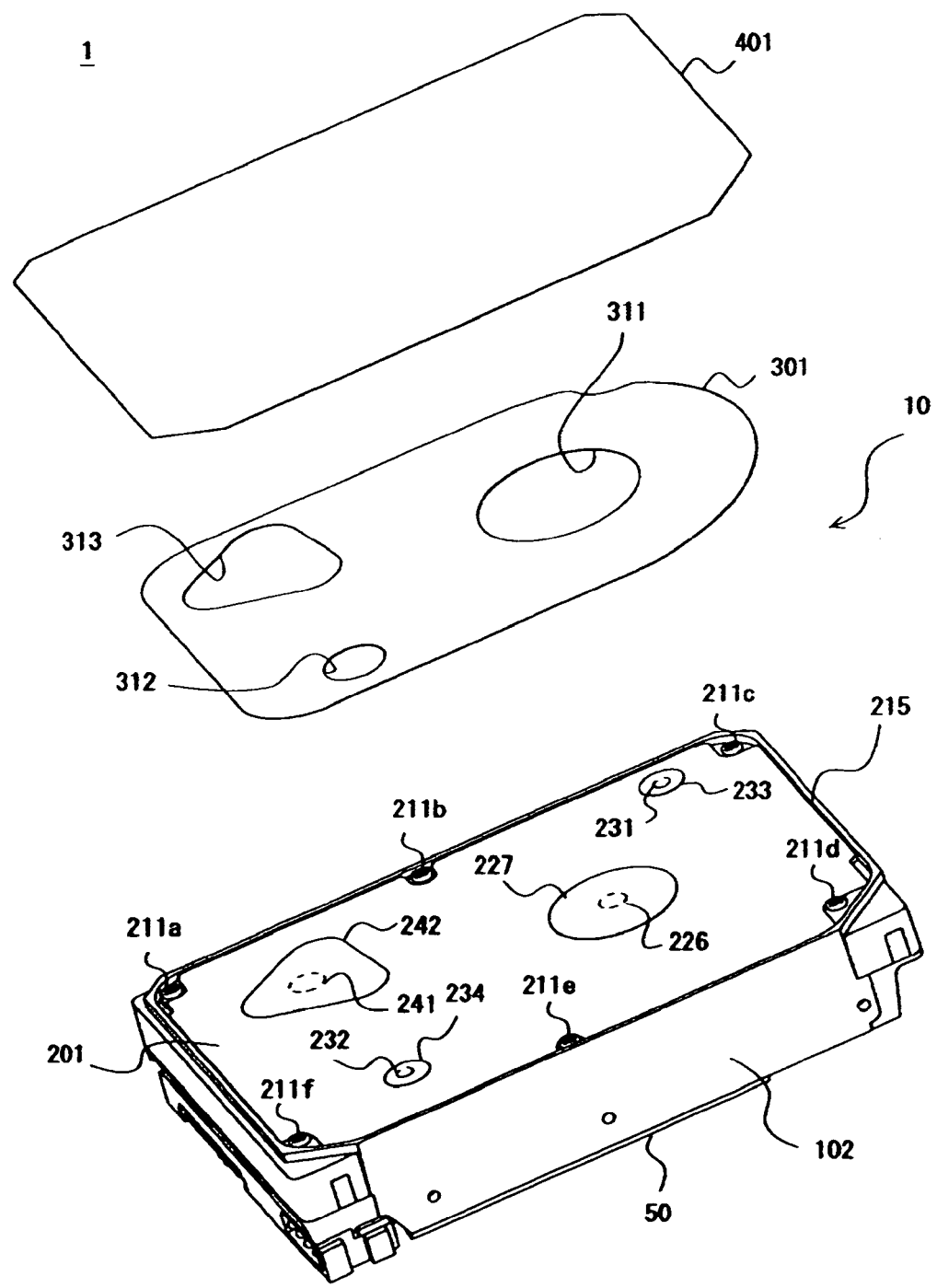
FIG. 1 is an exploded perspective view schematically showing the configuration of the hermetically-sealed HDD according to one embodiment of the present invention.

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention relate to a disk drive device and a manufacturing method thereof, more particularly to a hermetically-sealed disk drive device suitable for sealing low-density gas, such as helium gas, within the device and a manufacturing method thereof.

A disk drive device according to an aspect of embodiments of the present invention comprises a base for housing a disk, a motor for rotating the disk, a head for accessing the disk and a moving mechanism for supporting and moving the head; a cover to be joined to the base; and gas of lower-density than air enclosed in an enclosure which is constituted by the base and the cover. The cover has at least two covered holes. At least one of the two holes is covered by a valve filter having a valve which is in an open state if inside pressure of the enclosure is lower than outside pressure and closes the hole if the inside pressure of the enclosure is higher than the outside pressure. The valve filter enables to inject low-density gas into the enclosure efficiently. Here, covering the hole through which the lower-density gas is injected into the enclosure by the valve filter suppresses leak in injecting the low-density gas and improves workability.

Air current in a vicinity of the hole covered by the valve filter may be faster than air current in a vicinity of the other hole of the two holes. This shortens the injection time of the low-density gas. Especially, the moving mechanism pivots about an pivotal axis located outside of the disk to move the head over the disk, the hole covered by the valve filter and the other hole are formed at positions sandwiching the moving mechanism, the hole covered by the valve filter is positioned at the disk side of the moving mechanism, and the other hole is positioned at a side of the moving mechanism opposite to the disk. Since the air current near the rotating disk is fast, the injection time of low-density gas can be shortened.

Another aspect of embodiments of the present invention is a manufacturing method of a disk drive device. This manufacturing method arranges a disk, a motor for rotating the disk, a head for accessing the disk, and a moving mechanism for supporting and moving the head in a base. In an enclosure where a cover has been joined to the base, the disk, the motor, the head, and the moving mechanism are enclosed. It injects low-density gas which has lower-density than air through an injection hole formed on the enclosure as emitting air in the enclosure through an emission hole formed on the enclosure in a state that the motor is rotating the disk. Here, air current at the injection hole caused by the disk rotation is faster than air current at the emission hole in the enclosure. Such an injection hole and an emission hole can shorten the injection time of the low-density gas.

The moving mechanism may pivot about a pivotal axis located outside of the disk to move the head over the disk, the injection hole and the emission hole are formed at positions sandwiching the moving mechanism, and the injection hole is located at the disk side of the moving mechanism and the emission hole is located at a side of the moving mechanism opposite to the disk. Since the air current near the rotating disk is fast, the injection time of low-density gas can be shortened. Further, the injection hole may face a space which is close to an outer peripheral end of the disk surface and outer than the outer peripheral end.

The injecting low-density gas may inject the low-density gas in a state that a valve filter has been attached to the injection hole, the valve filter being in an open state if an inside pressure of the enclosure is lower than an outside pressure and closing the hole if the inside pressure of the enclosure is higher than the outside pressure. This suppresses leak in injecting the low-density gas and improves workability.

Yet another aspect of embodiments of the present invention is a manufacturing method of a disk drive device. This method arranges a disk, a motor for rotating the disk, a head for accessing the disk, and a moving mechanism for supporting and moving the head in a base. In an enclosure where a cover has been joined to the base, the disk, the motor, the head, and the moving mechanism are enclosed. It injects low-density gas which has lower density than air through an injection hole on the cover to which a valve filter is attached as emitting air in the enclosure through an emission hole on the cover in a state that the motor is rotating the disk, the valve filter being in an open state if an inside pressure of the enclosure is lower than an outside pressure and closing the hole if the inside pressure of the enclosure is higher than the outside pressure. This suppresses leak in injecting the low-density gas and improves workability.

The moving mechanism may pivot about a pivotal axis provided outside of the disk to move the head over the disk, the injection hole and the emission hole are formed at positions sandwiching the moving mechanism, and the injection hole is located at the disk side of the moving mechanism and the emission hole is located at a side of the moving mechanism opposite to the disk. This shortens the injection time of the low-density gas.

According to embodiments of the present invention, low-density gas can be effectively injected to a disk drive device.

Hereinafter, certain embodiments of the present invention are described. For clearness of explanation, the following description and the accompanying drawings contain omissions and simplifications as appropriate. Throughout the drawings, the like components are denoted by like reference numerals, and their repetitive description is omitted if not necessary for the sake of clearness. In one embodiment, a hard disk drive (HDD) is described as an example of a disk drive device. A feature of the present embodiment is low-density gas injection into the HDD.

FIG. 1 is an exploded perspective view schematically illustrating the configuration of the hermetically-sealed HDD 1 according to the present embodiment. The HDD 1 comprises a head disk assembly (referred to as HDA hereinbelow) 10 and a control circuit board 50 fixed to the outer bottom surface of the HDA 10. In the HDD 1 of the present embodiment, low-density gas which has lower-density than air is enclosed in an enclosure for housing the components. This suppresses turbulence and windage loss caused by rotation of the magnetic disk or pivot of the actuator. Although hydrogen or helium is considered as the low-density gas to be used, helium is optimum because it is much effective, stable, and safe. Hereinbelow, a case using helium is described by way of example.

The HDA 10 has a base 102, an inner cover 201 as a primary cover, an adhesive layer 301, and an outer cover 401 as a secondary cover. The inner cover 201 is fixed to the base 102 with screws 211 *a* to 211 *f* with a gasket interposed therebetween (not shown in FIG. 1) and these constitute the enclosure. In the interior space formed by the base 102 and the inner cover 201, components constituting a part of the HDA 10 are housed. To the enclosure of the present embodiment, the outer cover 401 and the adhesive layer 301 adhering itself to the enclosure are attached.

The position of the opening 311 of the adhesive layer 301 corresponds to the one of a spindle motor (SPM). On the inner cover 201, a hole 226 for a screw for fixing the SPM to fit is formed. A sealing tape 227 seals the hole 226. The opening 331 is formed to enclose the sealing tape 227. The opening 313 is located at the position facing a pivotal axis of the actuator and encloses a sealing tape 242 for sealing a screw hole 241 for a screw to fix the actuator. The opening 312 is formed at a position of the gas emission hole 232 in injecting helium gas and encloses the sealing tape 234 for sealing the gas emission hole 232.

The inner cover 201 has a helium injection hole 231 and a sealing tape 233 for sealing the hole. In injecting helium gas, helium gas is injected through the helium injection hole 231 and the air inside the interior space is pushed out through the gas emission hole 232. After the helium injection into the interior space 213 is finished, the helium injection hole 231 and the gas emission hole 232 are sealed with the sealing tapes 233 and 234 respectively. The helium gas injection into the interior space 213 will be described later in detail. The above sealing tapes may be made of aluminum.

In manufacturing the HDD 1, first, respective components to be mounted in the base 102 are manufactured and they are mounted in the base 102. Then, the inner cover 201 is fixed to the base 102 with screws 211 *a* to 211 *f*. The inner cover 201 is formed by a plate made of such as stainless steel, aluminum, brass, or the like. After the inner cover 201 has been temporally joined with the screws 211 *a* to 211 *f*, helium gas is injected into the interior space constituted by the inner cover 201 and the base 102.

Then, the adhesive layer 301 and the outer cover 401 are mounted. On this occasion, the section where the helium gas in the enclosure is likely to leak is the joining section of the base 102 and the outer cover 401. In order to hermetically seal the particular section, the upper part 215 of the side wall of the base 102 and the outer cover 401 are laser-welded or solder jointed. When the laser-welding or solder joint is used, the materials of the base 102 and the outer cover 401 should be selected in view of their durability, reliability, and cost. For example, either set of the base 102 formed by aluminum die-casting and the aluminum outer cover 401 formed by pressing or cutting, or the base 102 formed by cold forging from an aluminum alloy whose contents of copper and magnesium are relatively small and the aluminum outer cover 401 formed by pressing or cutting is preferably selected.

A helium gas filling step in manufacturing the HDD 1 will be described. In the helium gas filling step, helium gas is injected into the interior space through the helium injection hole 231 of the inner cover 201 as being pressured in a state that the inner cover 201 has been fixed to the base 102 which encloses the components. At this time, the air inside the interior space is pushed out by the injected helium gas to be emitted through the gas emission hole 232. While the helium gas is being injected, the magnetic disk in the interior space is rotating. Thus, the helium gas injected through the helium injection hole 231 is likely to spread within the interior space so that the injection time can be shortened.

Figure 2:
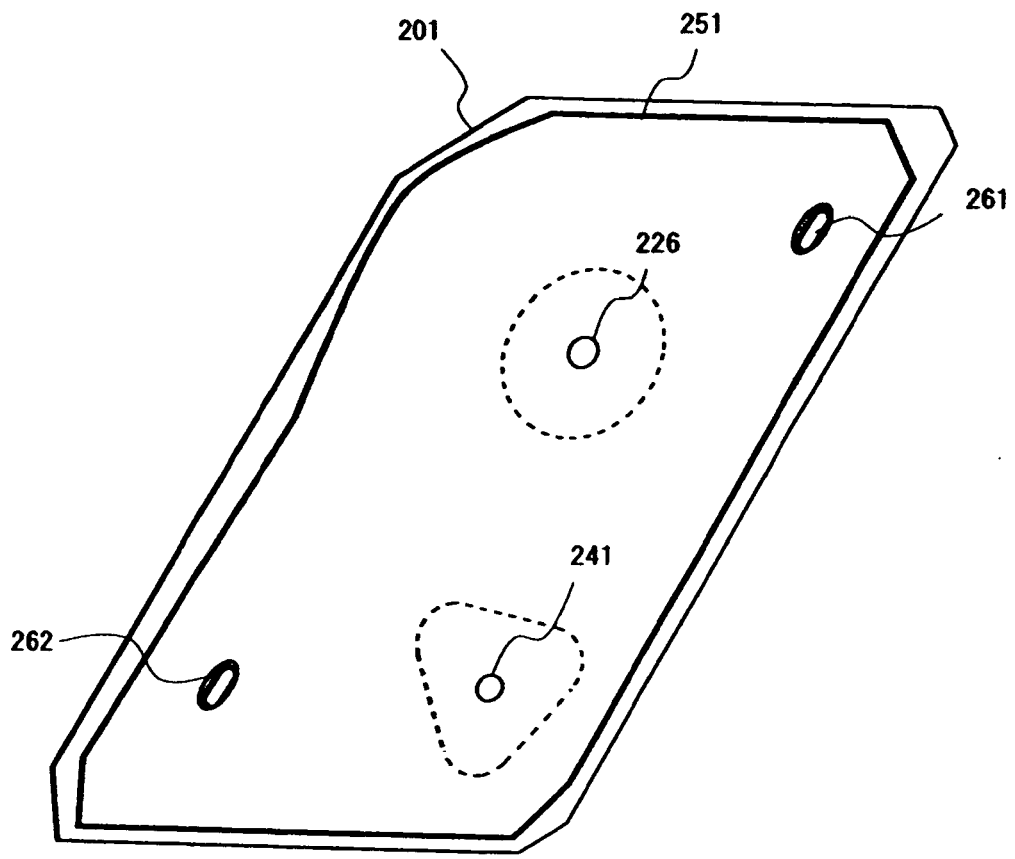
FIG. 2 is a schematic view showing the valve filter attached to the interior space side surface of the inner cover of the HDD according to one embodiment.

To the inner cover 201 of the present embodiment, filters to cover the helium injection hole 231 and the gas emission hole 232 are attached. FIG. 2 is a perspective view showing the interior space side surface of the inner cover 201. Inside a gasket 251, an injection hole filter 261 to cover the helium injection hole 231 and an emission hole filter 262 to cover the gas emission hole 232 are attached. In the example of FIG. 2, the injection hole filter 261 and the emission hole filter 262 have the same structure. Accordingly, the injection hole filter 261 will be described below.

Figure 3A:
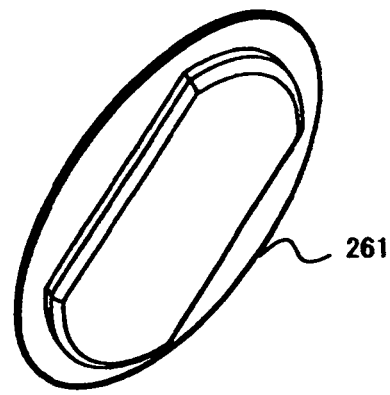
FIGS. 3(a) and 3(b) are views schematically showing the configuration of valve filter according to one embodiment.
Figure 3B:
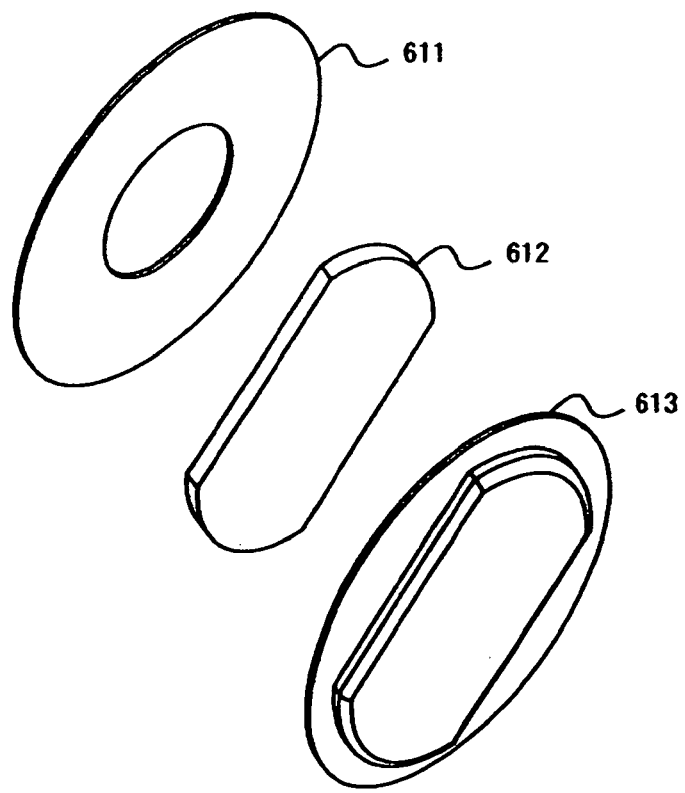

FIG. 3(*a*) is a perspective view showing the shape of the injection hole filter 261 as viewed from the interior space and FIG. 3(*b*) is an exploded perspective view of the injection hole filter 261. The injection hole filter 261 is constituted by three components, i.e., an adhesive member 611, a valve member 612, and a filter member 613 in order from the inner cover 201 side (top of the drawing). The adhesive member 611 is a double-face adhesive tape and adheres the filter member 613 to the surface of the inner cover 201 and adheres the valve member 612 to the surface of the inner cover 201 with the valve member 612 closed. The filter member 613 is placed to completely cover the adhesive member 611 and the valve member 612.

The valve member 612 is in an open state while the helium gas is being injected and turns to a close state by covering the helium injection hole 231 when the helium gas injection has been finished. The valve member 612 is made of polyethylene terephthalate (PET), for example. The filter member 613 prevents dust from entering the inside of the interior space in injecting helium gas. The filter member 613 is made of polytetrafluoroethylene (PTFE), for example. On the filter member 613, a number of pores are formed and gases such as air and helium gas will pass through them but dust is filtered. The respective materials and shapes of the adhesive member 611, the valve member 612, and the filter member 613 may be selected as appropriate according to the designs.

Figure 4A:
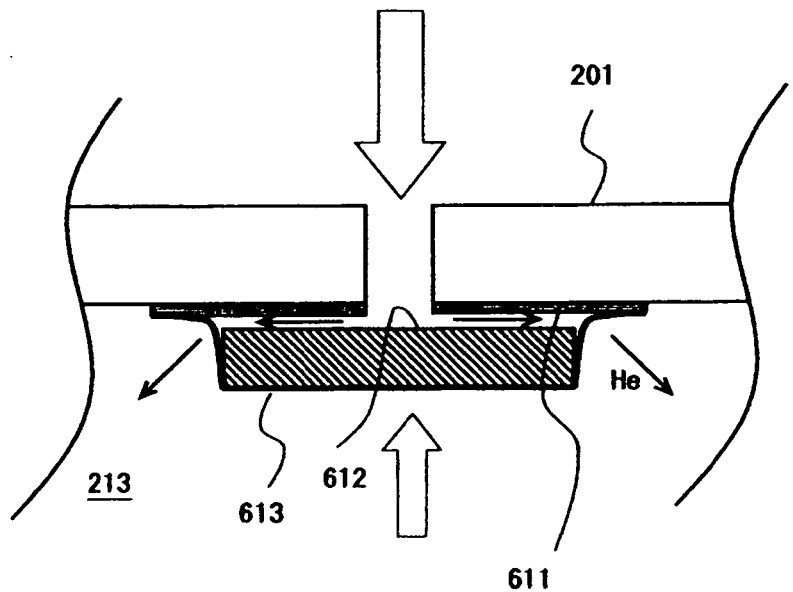
FIGS. 4(a) and 4(b) are views schematically showing the operation of the valve filter attached to the helium gas injection hole according to one embodiment.
Figure 4B:
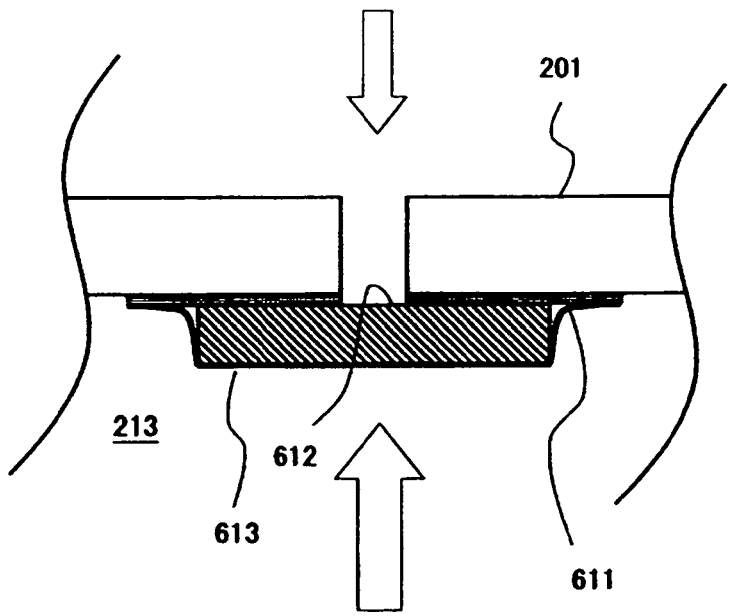

FIGS. 4(*a*) and 4(*b*) are cross-sectional views schematically showing operational states of the injection hole filter 261. FIG. 4(*a*) shows the injection hole filter 261 with the valve member 612 in an open state and FIG. 4(*b*) shows the injection hole filter 261 with the valve member 612 in a closed state. The open state of FIG. 4(*a*) is a state that the helium gas is being injected and the closed state of FIG. 4(*b*) is a state that the helium gas has been finished to be injected. The valve member 612 performs open and close operation in accordance with the difference between the inside pressure and the outside pressure of the interior space 213. When the outside pressure is higher than the inside pressure, the valve member is in the open state; and when the inside pressure is higher than the outer pressure, the valve member is in the close state.

As shown in FIG. 4(*a*), when the helium gas is injected from the outside, the valve member 612 moves toward the filter member 613 because the outside pressure of the enclosure is higher than the inside pressure of the interior space 213. The filter member 613 is plastic deformable and supports the valve member 612 pressed by the outside pressure. A gap is formed between the valve member 612 and the adhesive member 611 (the surface of the inner cover 201) and the helium gas flowing through the helium injection hole 231 is injected to the interior space 213 through the gap. Dust is removed by the helium gas passing through the filter member 613.

When the helium gas injection has been finished, the valve member 612 closes the helium injection hole 231 as shown in FIG. 4(*b*). Helium gas is injected until the inside pressure of the interior space 213 becomes higher than the outside pressure. Specifically, helium gas is injected until the inside pressure reaches approximately 1.2 atm. When the helium gas injection is stopped, the valve member 612 is pushed by the inside pressure of the interior space 213, moves toward the surface of the inner cover 201, and is pressed against it. In the injection hole filter 261 of the present example, the adhesive member 611 adhering to the inner cover 201 adheres and fixes the closed valve member 612. This maintains the valve member 612 in the closed state even though the inside pressure is lowered.

When the helium gas injection is finished, an aluminum sealing tape 233 is adhered to the outside of the helium injection hole 231 to hermetically seal the helium injection hole 231 from the outside. Basically, the sealing tape 233 seals the helium injection hole 231. In addition to it, attaching the filter having a valve function to the helium injection hole 231 as described above enables the helium injection hole 231 to be covered at the same time as the finish of the helium gas injection so that leak of helium gas after injection can be prevented easily.

Figure 5A:
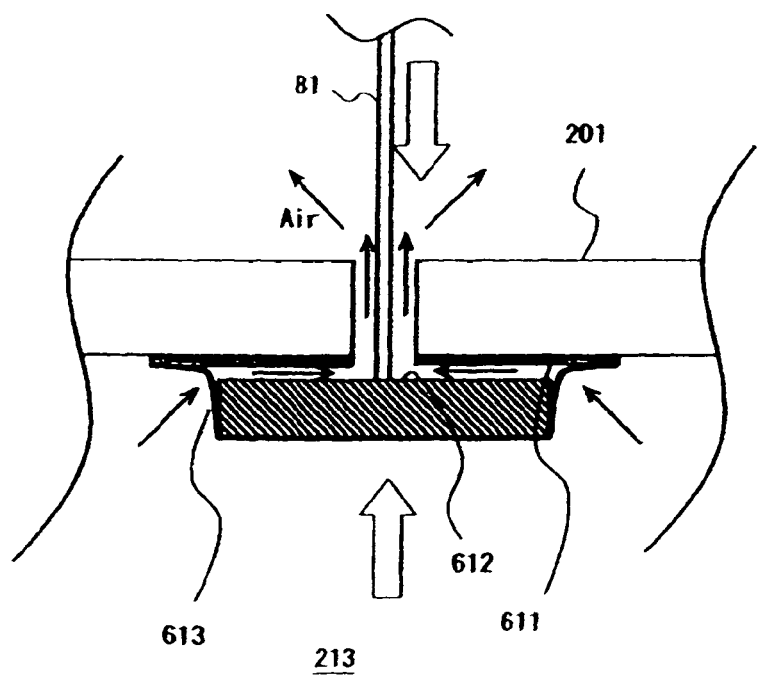
FIGS. 5(a) and 5(b) are views schematically showing the operation of the valve filter attached to the gas emission hole according to one embodiment.
Figure 5B:
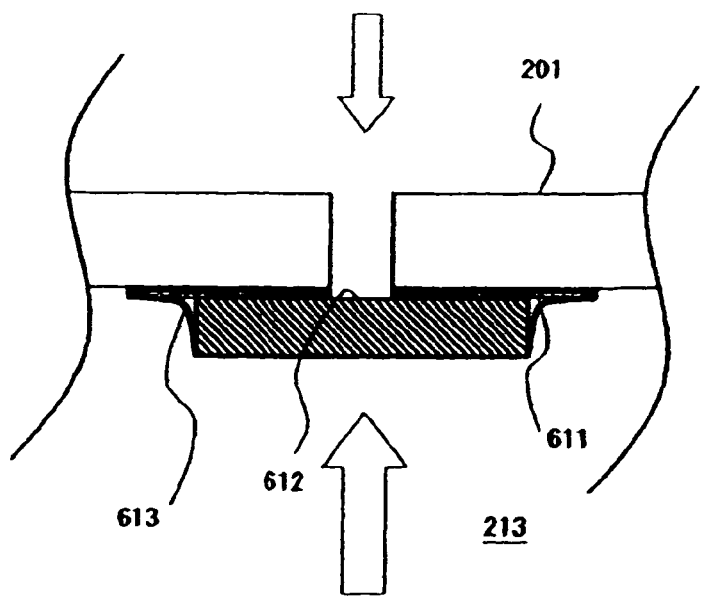

While the helium gas is being injected, the air in the interior space 213 flows out to the outside through the gas emission hole 232. As described above, the injection hole filter 261 and the emission hole filter 262 have the same structure. FIGS. 5(a) and 5(b) are cross-sectional views schematically showing operational states of the emission hole filter 262. FIG. 5(a) shows the emission hole filter 262 with the valve member 612 in an open state and FIG. 5(b) shows the emission hole filter 262 with the valve member 612 in a closed state.

While the helium gas is being injected, the inside pressure is higher between the inside and the outside of the gas emission hole 232. Therefore, as shown in FIG. 5(a), the valve member 612 is pressed from the outside to the inside using a jig such as a needle 81. Thereby the valve member 612 becomes in the open state and the air in the interior space 213 is emitted to the outside through the gap between the valve member 612 and the inner cover 201. After a predetermined time has elapsed, the needle 81 is removed before stopping the helium gas injection. This makes the valve member 612 pressed against the inner cover 201 by the inside pressure to close the gas emission hole 232. The valve member 612 closing the gas emission hole 232 causes rise of the inside pressure of the interior space 213, and when the injection through the helium injection hole 231 is stopped, the injection hole filter 261 automatically covers the helium injection hole 231. Then, the outside of the gas emission hole 232 is sealed by the sealing tape 234. Moreover, in order to surely inject helium gas, the valve member may be pressed by means of the above-described jig.

The filter to be attached to the gas emission hole 232 may be a valveless filter which does not have a valve function. In this case, the outside of the gas emission hole 232 is sealed by the sealing tape 234 at the timing that the helium gas has filled up the interior space 213. In the case of the valveless filter, it is not necessary to press the valve member 612 so that manufacturing apparatuses can be simplified.

Figure 6A:
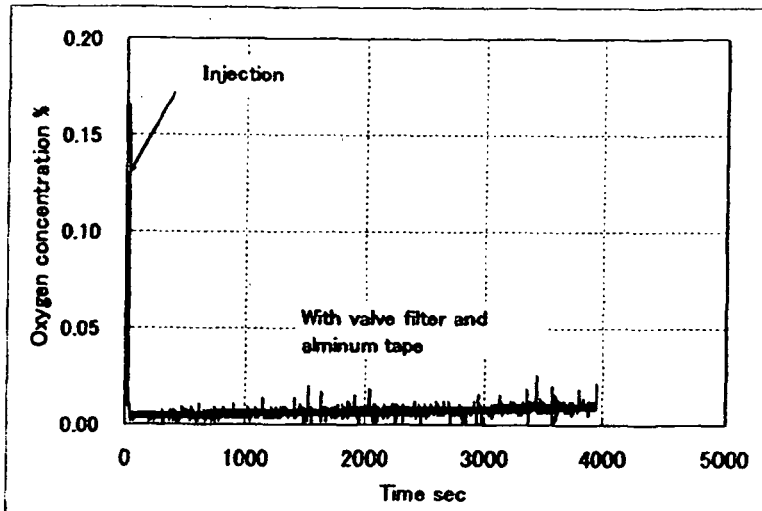
FIGS. 6(a)-6(c) are experiment results showing the effect of the valve filter according to one embodiment.
Figure 6B:
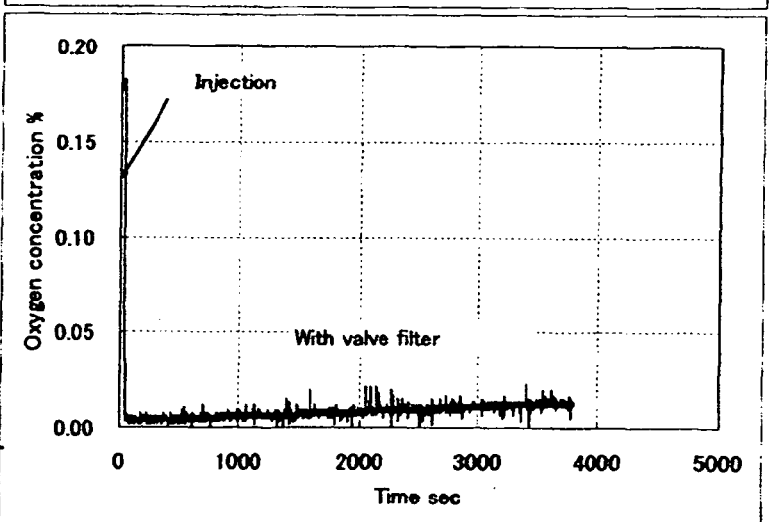
Figure 6C:
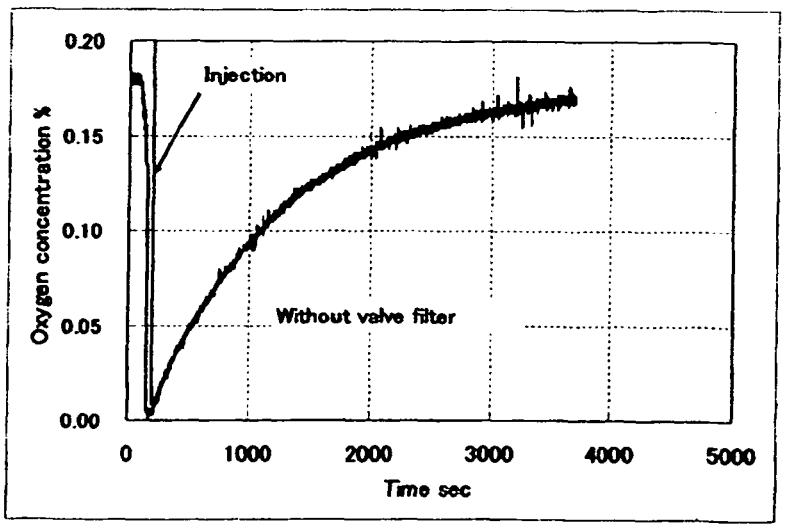

FIGS. 6(a) to 6(c) are measured data showing sealing function of the filter with valve according to embodiments of the present invention. FIG. 6(a) shows the relationship between the oxygen concentration within the interior space the holes on which are sealed by the valve filters and the aluminum sealing tapes and the elapsed time. FIG. 6(b) shows the relationship between the oxygen concentration within the interior space the holes on which are sealed by the valve filters but the sealing tapes are not used and the elapsed time. FIG. 6(c) shows the relationship between the oxygen concentration within the interior space the holes on which are sealed by filters without the valve function and the sealing tapes are not used and the elapsed time. That is, it corresponds to the state that only the filter member 613 has been attached to the hole.

When the oxygen concentration reaches 20%, the air has filled in the interior space and the helium gas has escaped.

As understood from FIGS. 6(a) to 6(c), it will be understood that the valve filter of embodiments of the present invention has a sufficient sealing capability. Referring to FIG. 6(c), it will be understood that the helium gas drastically escapes within a little time after the helium gas injection is stopped (indicated by Injection in the drawing). The valve filter of embodiments of the present invention can cover the injection hole at the same time as the stop of the helium gas injection so that the leak of the helium gas from the interior space can be effectively prevented.

Next, the positions of the holes to be used in the helium gas injection will be described. In injecting helium gas, it is important to reduce the time for replacing the air in the enclosure with helium gas as much as possible. The inventors have found that the positional relationship between the helium injection hole 231 and the gas emission hole 232 significantly influences the helium filling time in the interior space 213. In the helium gas injection step, helium gas is injected in a state that the magnetic disk is rotating. Since the rotation of the magnetic disk generates air current within the enclosure, this air current and the positional relationship between the helium injection hole 231 and the gas emission hole 232 may change the helium gas filling time in the interior space drastically.

Figure 7:
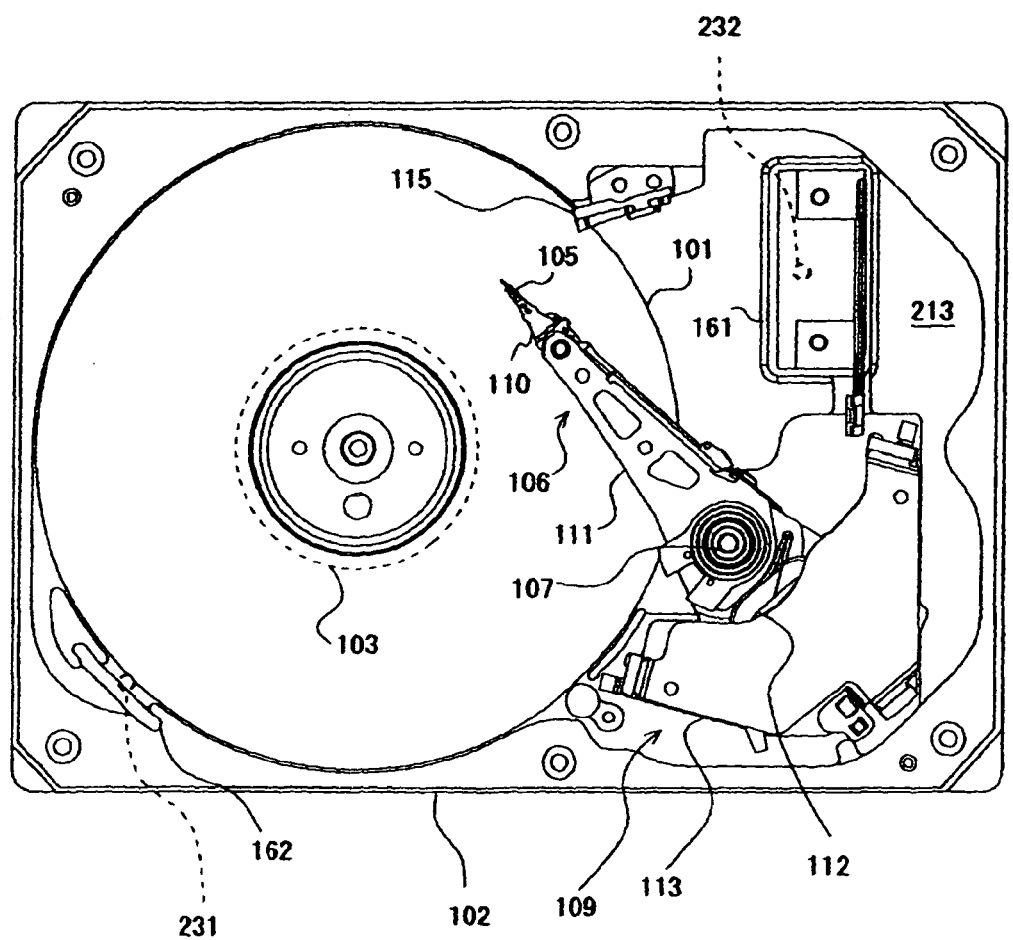
FIG. 7 is a top view schematically showing the arrangement in the interior space of the HDD according to one embodiment.

Preferable positions of the helium injection hole 231 and the gas emission hole 232 depend on the positions of the respective components within the interior space 213. Then, the configuration within the interior space formed by the inner cover 201 and the base 102 will be described first. FIG. 7 is a top view of the hermetically-sealed HDD 1 with the inner cover 201 and the outer cover 401 removed from the enclosure. The respective components of the HDD 1 are housed in the base 102. The HDD 1 comprises a magnetic disk 101 which is a disk for recording data. A head slider 105 comprises a head element portion for reading from and/or writing to the magnetic disk 101 with respect to data input from and/or output to an external host (not shown) and a slider a surface on which the head slider is formed.

The actuator 106 supports and moves the head slider 105. The actuator 106 is supported pivotably about a pivotal axis 107 and is driven by a voice coil motor (hereinbelow referred to as VCM) 109. An assembly of the actuator 106 and the VCM 109 is a moving mechanism of the head slider 105. The actuator 106 comprises respective components of a suspension 110, an arm 111, and a flat coil 112 connected in order from the tip end of the longitudinal direction where the head slider is placed. The VCM 109 comprises a flat coil 112, a stator magnet (not shown) fixed to a stator magnet support plate 113, and so on. A head gimbal assembly is constituted by a suspension 110 and the head slider 105.

The magnetic disk 101 is supported by a spindle motor (SPM) 103 fixed to the base 102 and is rotated by the SPM 103 at a predetermined angular rate. The actuator 106 moves the head slider 105 over a data region on the surface of the rotating magnetic disk 101 for reading/writing data from and to the magnetic disk 101. The pressure by air viscosity between the air bearing surface (ABS) of the slider facing the magnetic disk 101 and the rotating magnetic disk 101 balances to a pressure applied toward the magnetic disk 101 by the suspension 110 for the head slider 105 to fly over the magnetic disk 101 with a certain gap.

When the magnetic disk 101 stops rotating, for example, the actuator 106 retracts the head slider 105 from above the data region to a ramp 115. Embodiments of the present invention can be applied to a contact start and stop (CSS) scheme in which the head slider 105 is retracted to a zone provided in an inner periphery of the magnetic disk 101 when it does not write or read data.

When the magnetic disk 101 rotates, fast air current is generated above the magnetic disk 101 and in the vicinity of the outer peripheral end of the magnetic disk 101. At the position away from the magnetic disk 101, the air current is slow or little air current is generated so that the gas is in a still state. In the case of filling up helium gas in the interior space, it is preferable for injecting helium gas from the position where the air current is fast and discharging the gas from the position where the air current is slower.

This can be explained as follows. The helium gas injection from the position where the air current is fast causes that the injected helium gas spreads within the interior space 213 rapidly. In addition, emitting the gas from the position where the air current is slower enables the air which has already stayed in the interior space to be emitted prior to the helium gas. This achieves quicker replacement of the air with the helium gas within the interior space 213.

Figure 8A:
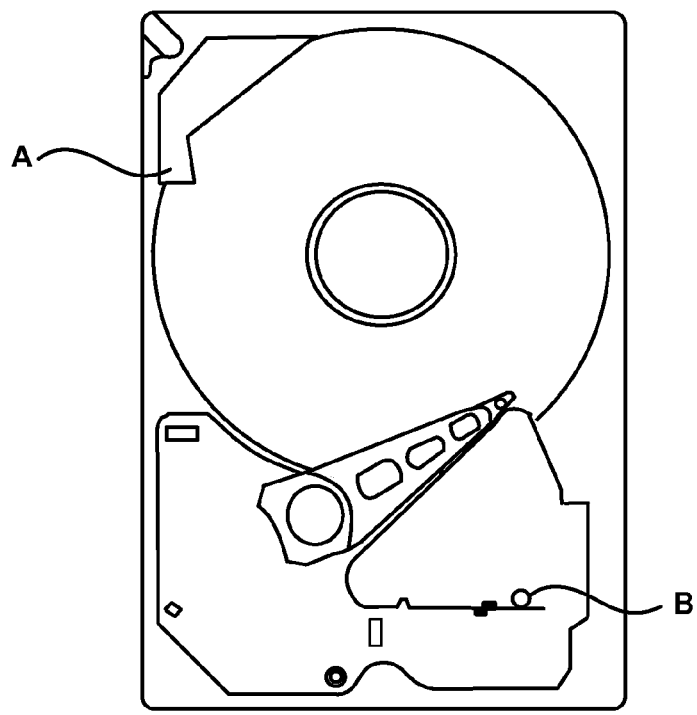
FIGS. 8(a) and 8(b) are analysis results of the states of air current and air pressure in the interior space of the HDD according to one embodiment.
Figure 8B:
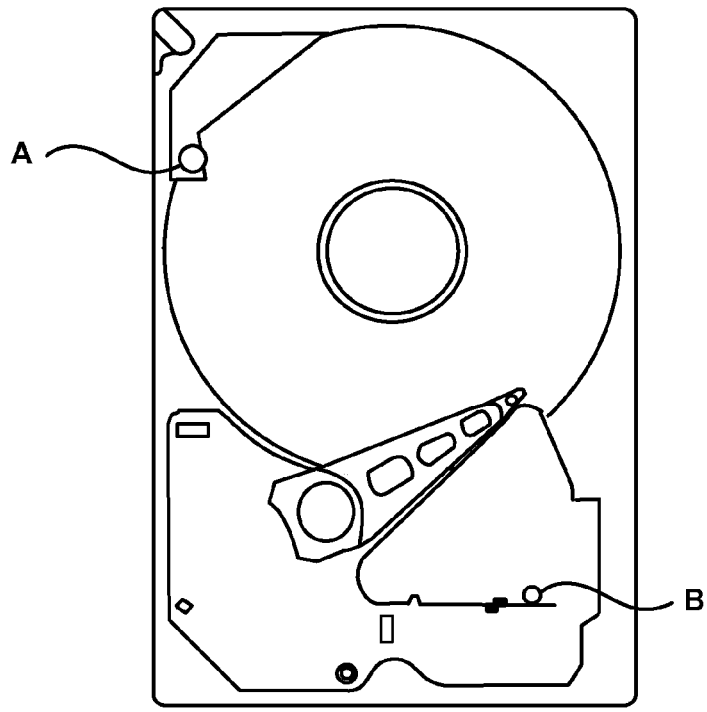

In this connection, a numerical analysis and measurement experiments were performed FIG. 8(a) shows an average current speed distribution within the interior space 213 in a state that the magnetic disk 101 is rotating. FIG. 8(b) shows an average pressure distribution within the interior space in a state that the magnetic disk 101 is rotating. In FIGS. 8(a) and 8(b), the average current speed distribution and the average pressure distributions are small in the white portions and they are large in the black portions. The helium injection hole 231 of the present embodiment is located in circles A in FIGS. 8(a) and 8(b) and the gas emission hole 232 is located in circles B in FIGS. 8(a) and 8(b). As understood from FIG. 8(a), the air current at the point A is fast and the one at the point B is very slow so that the gas stagnates. On the other hand, in FIG. 8(b), there is not a large difference in pressure between the points A and B.

A case that the helium gas was injected through the helium injection hole 231 at the point A and the gas was emitted through the gas emission hole 232 at the point B and the inverted case that the helium gas was injected through the gas emission hole 232 at the point B and the gas was emitted through the helium injection hole 231 at the point A were compared. The compared values are consumption current of the SPM 103 in the rotation of the magnetic disk 101 and time from the start of the helium gas injection until a predetermined amount of helium gas has been filled up.

FIG. 9(a) shows measured results of the consumption current of the SPM 103. Three respective measurements have been made in the case of injection from the point A and emission from the point B and in the case of injection from the point B and emission from the point A. While the average reduced amount of the consumption current in the case of the injection from the point A and the emission from the point B was 204.9 mA, the average reduced amount of the consumption current in the case of the injection from the point B and the emission from the point A was only 190.7 mA. This result shows that the helium gas is spread more and filling up rate of the helium gas is higher so that power savings is achieved more in the case of the injection from the point A and the emission from the point B.

FIG. 9(b) shows measured results of time (time constant) from the helium gas injection start timing to reach 63.2%, assuming the average current consumption reduced amount in the case of the helium gas flowing from the point A to the point B to be 100%. Three respective measurements were made in the case of injection from the point A and emission from the point B and in the case of injection from the point B and emission from the point A. While the average time constant in the case of the injection from the point A and the emission from the point B was 15.2 sec., the average reduced amount of the consumption current in the case of the injection from the point B and the emission from the point A was no less than 17.3 sec. This result shows that the helium gas can be filled up more quickly in the case of the injection from the point A and the emission from the point B.

Returning to FIG. 7, the positions of the helium injection hole 231 and the gas emission hole 232 are described. As described above, it is preferred that the helium injection hole 231 is located at the position where the air current is fast and the gas emission hole 232 at the position where the air current is slower. Taking account of component arrangement in the interior space 213, the gas emission hole 232 is preferably provided at the opposite side of magnetic disk 101 with respect to the actuator arm 111 (the right side of the actuator arm 111 in FIG. 7). Specifically, the position facing the connector 161 which transmits signals of the head slider 105 to the outside or its vicinity is preferred. Since the gas emission hole 232 is preferably located at the position which does not overlap the actuator 106, it is preferably located at the side of the actuator 106 opposite to the magnetic disk in a state that the actuator 106 is located at the retract position on a ramp 115 (the right side in FIG. 7).

The helium injection hole 231 is preferably located at the position where the air current is fast and away from the gas emission hole 232. Thus, the helium injection hole 231 is preferably provided at the magnetic disk 101 side with respect to the actuator arm 111 (the left side of the actuator arm 111 in FIG. 7). At the side of the magnetic disk 101 opposite to the actuator, the filter 162 for collecting dust within the interior space 213 and a flow channel for sending air current to the filter 162 are provided. Therefore, the helium injection hole 231 is preferably located at the position overlapping the filter 162 or the position which is close to and outer than the outer peripheral end of the magnetic disk 101 and does not overlap the filter 162 but overlaps the flow channel.

As set forth above, embodiments of the present invention are described by way of the preferred embodiments but is not limited to the above embodiments. A person skilled in the art can easily modify, add, and convert the each element in the above embodiments within the scope of the present invention. For example, embodiments of the present invention are especially useful to the HDDs but may be applied to the other type of disk drive devices. The low-density gas to be injected is not limited to helium gas. The holes for gas injection are preferably formed on the cover but it does not eliminate to form them on the base.

What is claimed is:
1. A disk drive device comprising:
a base for housing a disk,
a cover joined to the base and having at least two holes; and
gas of lower-density than air enclosed in an enclosure comprising the base and the cover, wherein at least one of the holes is covered by a valve filter having a valve which is in an open state if inside pressure of the enclosure is lower than outside pressure and closes the hole if the inside pressure of the enclosure is higher than the outside pressure.
2. The disk drive device according to claim 1, wherein the at least one of the holes covered by the valve filter is a hole through which the lower-density gas is injected into the enclosure.

3. The disk drive device according to claim 1, wherein air current in a vicinity of the at least one of the holes covered by the valve filter is faster than air current in a vicinity of the other hole of the two holes.

4. The disk drive device according to claim 1, further comprising:
 a moving mechanism that pivots about a pivotal axis located outside of the disk to move a head over the disk; and the at least two holes are formed at positions sandwiching the moving mechanism; the at least one of the holes covered by the valve filter is positioned at the disk side of the moving mechanism and the other hole is positioned at a side of the moving mechanism opposite to the disk.

5. A manufacturing method of a disk drive device comprising:
 joining a cover to a base and forming an enclosure for enclosing a disk, the cover having at least an injection hole and an emission hole therein; and
 injecting a gas which has lower-density than air through the injection hole and emitting air in the enclosure through the emission hole, air current at the injection hole caused by a rotation of the disk.

6. The manufacturing method according to claim 5, the further comprising:
 pivoting a moving mechanism about a pivotal axis located outside of the disk to move a head over the disk; the injection hole and the emission hole are formed at positions sandwiching the moving mechanism, the injection hole located at the disk side of the moving mechanism and the emission hole located at a side of the moving mechanism opposite to the disk.

7. The manufacturing method according to claim 6, wherein the injection hole faces a space which is close to an outer peripheral end of a disk surface.

8. The manufacturing method according to claim 5, further comprising:
 injecting the gas depends on a state of a valve filter has been attached to the injection hole, wherein the valve filter is in an open state if an inside pressure of the enclosure is lower than a pressure outside of the enclosure and wherein the valve is in a closed state if the inside pressure of the enclosure is higher than the pressure outside of the enclosure.

9. A manufacturing method of a disk drive device comprising:
 forming an enclosure for housing a disk, the enclosure comprising a cover having at least an injection hole and an emission hole therein;
 injecting a gas which has lower-density than air through the injection hole on the cover and emitting air in the enclosure through the emission hole on the cover; and
 attaching a valve filter to the injection hole wherein the valve filter is in an open state if an inside pressure of the enclosure is lower than a pressure outside of the enclosure and wherein the valve is in a closed state if the inside pressure of the enclosure is higher than the pressure outside of the enclosure.

10. A manufacturing method according to claim 9, further comprising:
 pivoting a moving mechanism about a pivotal axis provided outside of the disk to move a head over the disk; the injection hole and the emission hole are formed at positions sandwiching the moving mechanism, the injection hole located at the disk side of the moving mechanism and the emission hole located at a side of the moving mechanism opposite to the disk.

11. The manufacturing method according to claim 10, wherein the injection hole faces a space which is close to an outer peripheral end of a disk surface.

* * * * *

UNITED STATES PATENT AND TRADEMARK OFFICE
CERTIFICATE OF CORRECTION

| | |
|---|---|
| PATENT NO. | : 8,705,202 B2 |
| APPLICATION NO. | : 13/190470 |
| DATED | : April 22, 2014 |
| INVENTOR(S) | : Yoshiyuki Hirono et al. |

It is certified that error appears in the above-identified patent and that said Letters Patent is hereby corrected as shown below:

In the Claims

Column 11, Claim 6, Lines 24/25:   Delete: "the further comprising:"

Insert: --further comprising:--

Signed and Sealed this
Twenty-third Day of December, 2014

Michelle K. Lee
*Deputy Director of the United States Patent and Trademark Office*